UNITED STATES PATENT OFFICE.

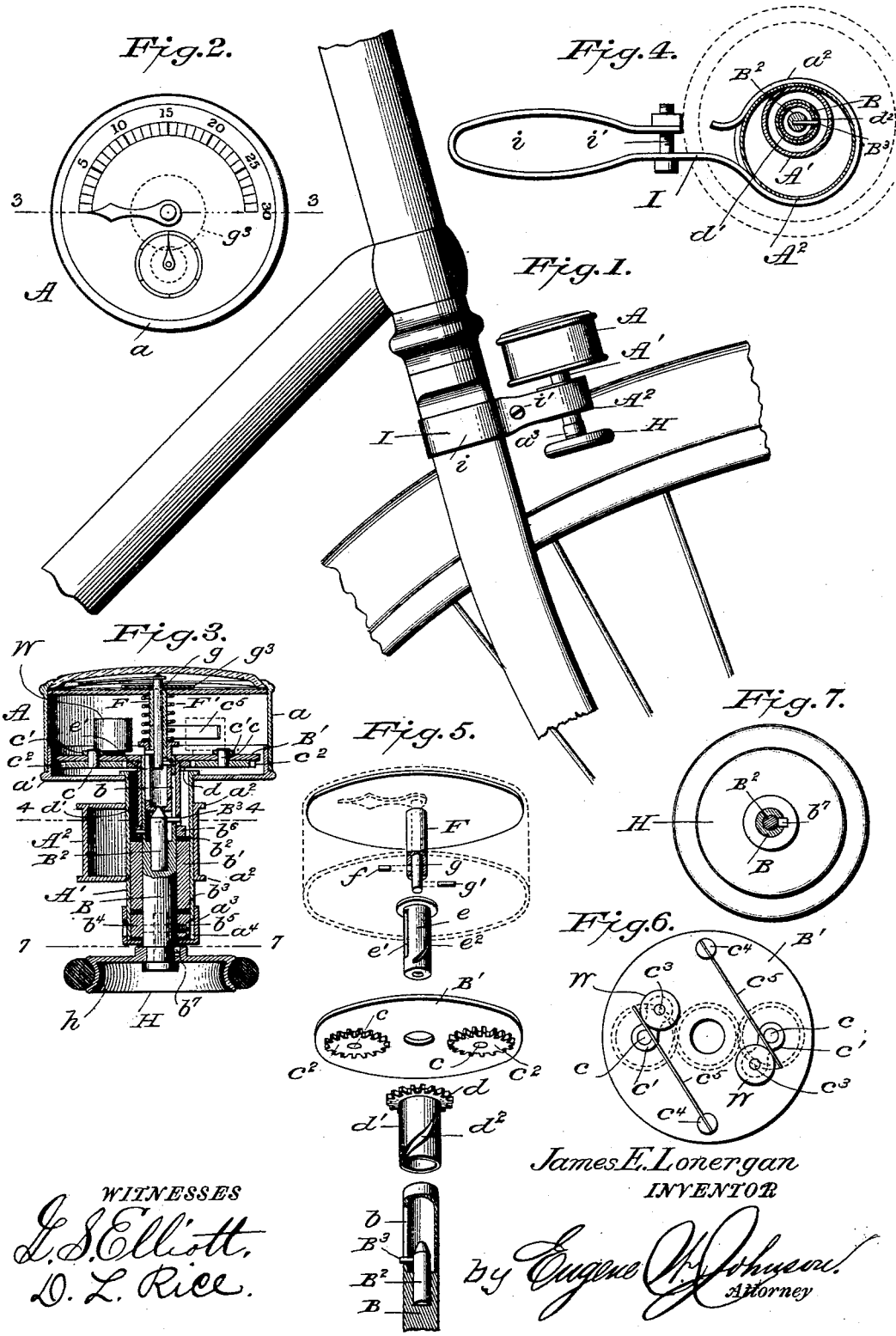

JAMES E. LONERGAN, OF WATERBURY, CONNECTICUT.

SPEED-INDICATOR AND HOLDER THEREFOR.

SPECIFICATION forming part of Letters Patent No. 587,530, dated August 3, 1897.

Application filed February 27, 1897. Serial No. 625,278. (No model.)

*To all whom it may concern:*

Be it known that I, JAMES E. LONERGAN, a citizen of the United States of America, residing at Waterbury, in the county of New Haven and State of Connecticut, have invented certain new and useful Improvements in Speed-Indicators and Holders Therefor; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in speed-indicators for bicycles, velocipedes, or other vehicles, and has for its object to provide a compact and efficient device which may be applied to the frame of a bicycle and has motion imparted thereto from the tire or rim of a wheel, the rotation of one of the parts effecting movement of the indicating mechanism, so that the rider or occupant of the vehicle can determine the rate of speed per hour at which he is traveling, the device being so constructed and supported that it is not liable to be injured by the jars incident to the movement of the vehicle; also, to provide means whereby the speed-indicator can be quickly thrown out of engagement with the wheel of the vehicle.

The invention consists in providing a speed-indicator with an eccentric or cam portion for engagement with a holder therefor, so that by simply turning the indicator in its holder it will be thrown out of engagement with the wheel of the vehicle.

The invention also consists in the construction of the friction-wheel, the same being made up of a single piece with a concave flange or periphery to receive a ring, the center having a recessed hub which will effectively, with the means attached to the shaft, lock the shaft and friction-wheel in engagement with each other.

The invention further consists in the construction of the casing and parts contained therein to make up an efficient speed-indicator, as will be hereinafter set forth.

In the drawings, Figure 1 is a side elevation showing the speed-indicator applied to a bicycle. Fig. 2 is a plan view of the dial and parts which are visible to the rider. Fig. 3 is a vertical section taken on the line 3 3 on Fig. 2. Fig. 4 is a plan view of the holder, showing the same in engagement with the casing, and a sectional view of the casing, taken on the line 4 4 on Fig. 3. Fig. 5 is a perspective view showing some of the working parts separated. Fig. 6 is a plan view of the disk to which the governor is attached, and Fig. 7 is a sectional view on the line 7 7 of Fig. 3.

A refers to the casing, which consists of an upper section $a$, having a crystal and dial, said upper section engaging with a plate $a'$, having an upwardly-projecting flange and peripheral bead, which plate $a'$ has centrally attached a depending tubular section $A'$, which has rigidly attached thereto a cam or eccentric portion $A^2$, consisting of a ring carried by circular disks which project beyond the ring to provide flanges $a^2$. The lower end of the tubular section of the casing is partially closed by a cap $a^3$, the flange thereof covering the slot $a^4$ in the lower end of the section $A'$.

B refers to a shaft, the upper end of which is tubular and has a vertical slot $b$ and a recess of smaller diameter than the bore of the upper end of the shaft. To the upper end of the shaft is rigidly secured a disk or plate $B'$, and said shaft B is maintained in position in the part $A'$ of the casing by a hollow bearing-block $b'$, which frictionally engages the casing. Above and below said block are placed washers $b^2$ $b^3$. Below the washer $b^3$ a collar $b^4$ is clamped by a set-screw $b^5$, to which access can be had when the cap $a^3$ is removed. Above the washer $b^2$ is a fixed collar $b^6$. The two collars, which are at opposite ends of the hollow bearing-block $b'$, hold the shaft B against longitudinal movement, and the washers are preferably of vulcanized fiber, and below the block $b^4$ is a washer of felt to carry lubricants and render the bearing dust-proof. The lower end of the shaft is reduced to form a shoulder. Adjacent to the shoulder is a recess in which is placed a pin $b^7$. The lower end of the shaft has a threaded aperture, with which a screw engages to retain in place a friction-wheel H. The disk B' has on opposite sides of its center apertures, through which pass pins $c$ $c$, which are rigidly attached on one side of the disk to the ends of arms $c'$ $c'$ and on the other side to gear-wheels $c^2$ $c^2$. The arms carry at their outer end pins $c^3$ $c^3$, upon which are mounted rotatable weights W W. The upper face of the disk B' has upwardly-projecting studs $c^4$ $c^4$, which are split, to connect thereto the ends of flat springs $c^5$ $c^5$, the free ends bearing upon the periphery of the rotatable weights W W.

Gear-wheels $c^2$ $c^2$ engage with a pinion $d$, attached to a sleeve $d'$, having a spiral slot $d^2$, the sleeve being positioned over the upper end of the shaft B, so that its lower end will rest upon the collar $b^6$.

Within the tubular upper end of the shaft B is placed a longitudinally-movable sleeve $e$, the upper end having a flange, and the opposite end is partially closed by a transverse wall having a central aperture. The movable sleeve $e$ has a straight slot $e'$ and a curved slot $e^2$.

F refers to a tube which is attached to the dial-plate and carries a pin or stud $f$ for engagement with the slot $e'$ in the sleeve $e$, and this tube F is encircled by a spring F', the ends of which bear against the under side of the dial-plate and the flange of the sleeve $e$.

The index or pointer is attached to a spindle $g$, which extends through the tube F and carries near its lower end a stud or pin $g'$ for engagement with the curved slot $e^2$ of the longitudinally-movable sleeve $e$.

In the shaft B is placed a stud $B^2$, with a pointed upper end which engages with the base of the sleeve $e$, said stud carrying an outwardly-projecting pin $B^3$, which passes through the slot $b$ in the shaft and engages with the walls of the curved slot $d^2$ in the sleeve $d'$.

H refers to the friction-wheel, which is preferably struck up from sheet metal to provide a disk with a concave flange $h$ and central portion or hub of increased thickness, which is recessed to receive one end of a pin $b^7$, the other end thereof engaging with the shaft. The friction-wheel is held on the lower end of the shaft by a suitable screw, and a rubber ring is cemented on the flange.

The speed-indicator may be attached to the frame of a bicycle by means of a holder I, made up of a single piece of flat spring metal bent to provide a loop $i$, which embraces the fork and is clamped thereon by a bolt $i'$. The other end is bent in a circular form to embrace the eccentric portion $A^2$ of the speed-indicator, the edges of the holder engaging with the flanges thereof. This construction permits the indicator to be turned in the holder so that the friction-wheel will be caused to engage with the tire of the wheel or disengaged therefrom, and the speed-indicator is held in such a position that the dial can be readily seen by the rider of the wheel.

In operation the indicator is attached to the front fork of a bicycle, the friction-wheel contacting with the tire of the wheel, and is held against the same by spring-pressure, so that there may be a slight lateral movement to provide for the inequalities of the tire or adjustment of the wheel. As the shaft is rotated the disk carrying the governors will be turned, and as the governors are thrown outwardly by centrifugal force the gear-wheels connected thereto will be turned, and, as they engage the pinion on the sleeve, will turn the same, which effects a vertical movement of the stud $B^2$, which is held against rotation by its pin engaging with the straight slot. The stud in its upward movement raises the longitudinally-movable sleeve $e$ against the action of the spring, and said movement turns the spindle, the pin $g'$ engaging with the curved slot $e^2$, and moves the hand or pointer over the dial, and thus indicates the rate of speed. The figures on the dial indicate the number of miles per hour at which the bicycle is being propelled.

This device embodies as a feature thereof two vertically-movable members operating in unison and controlled by the rotary movement of the other parts and governors in which the outward movements of the weights are retained by springs which contact directly with the weights, which permits the use of weights of a comparatively small size, there being a rolling contact between the weights and springs.

Many changes in the construction of the parts can be made without departing from the invention, I having shown a preferable form, which is compact, light, and readily manufactured, the parts being assembled so that they may be easily separated for oiling or repairs.

Among the changes that can be made without departing from my invention I would mention that the dial shown in Fig. 2 is provided with a pointer (not previously described) which operates over a small circular dial, the pointer registering the minutes or parts thereof of the rate per mile at which the bicycle or vehicle is moving. The small pointer or hand is connected to a gear-wheel located beneath the dial by means of a stud, which is also connected to the hand. The spindle $g$ has rigidly attached thereto a gear-wheel $g^3$, which meshes with the gear-wheel connected to the smaller hand. A third circle or dial with graduations and a pointer may be added, if desired, and such pointer would be driven from the gear-wheel attached to the hereinbefore-mentioned smaller hand by the intervention of another gear-wheel, the latter being driven at a higher rate of speed than the preceding one.

The shaft B of the speed-indicator may be driven by a flexible shaft of suitable construction, as a coiled wire, and when so driven the friction-wheel will be attached to one end of the shaft, the other end being connected to the shaft B of the indicator.

Having thus described my invention, what I claim as new, and desire to secure by Letters Patent, is—

1. In combination with a speed-indicator, a casing therefor having an eccentric portion, of a holder for engagement with the frame of a vehicle or bicycle, and said eccentric portion.

2. In a bicycle attachment, the combination of a casing having an eccentric portion, of a holder which engages the eccentric portion of the casing and the fork of the bicycle, the attachment being rotatable in the holder, for the purpose set forth.

3. In a bicycle attachment embodying a casing having a cam or eccentric portion, the combination with a resilient holder shaped to embrace the cam or eccentric portion of the casing, and fork of the bicycle; together with clamping means carried by the holder, substantially as shown.

4. In a speed-indicator, the combination with a shaft having a tubular portion, a movable stud positioned therein, and provided with a pin which projects beyond the tubular portion, of a rotatable sleeve with curved slot engaged by the pin; together with vertically-movable sleeve, and a rotatable spindle carrying a hand or pointer, substantially as shown.

5. In a speed-indicator, the combination with the rotatable shaft, a rotatable sleeve, a vertically-movable stud, which is raised and lowered by the rotatable sleeve, a vertically-movable sleeve, one end engaged by the stud, and the other by a spring, a pointer carried by a spindle, and a governor, substantially as set forth.

6. In a governor for speed-indicators, the combination with weights rotatably mounted upon arms, of springs which bear upon the peripheries of the rotatable weights, substantially as shown.

7. In a speed-indicator, the combination of the governor comprising movable arms, rotatable weights mounted thereon, springs engaging the weights and gear-wheels mounted on the studs to which the arms are attached, of a rotatable sleeve having a pinion and a curved slot, a driven shaft attached to the disk carrying the governing mechanism, a stud and a sleeve positioned in the hollow end of the shaft, and a rotatable spindle upon which the pointer or hand is attached, the parts being organized substantially as shown.

8. In a speed-indicator, the combination with governing mechanism comprising weighted arms and springs which frictionally engage the weights carried thereby, of gear-wheels connected to the arms, a sleeve having a pinion and a curved slot, a driving-shaft upon which is mounted a disk carrying the governing mechanism, said driving-shaft having a hollow portion, and a vertical slot in the wall of said hollow portion, two vertically-movable members positioned in the driving-shaft, and a spindle with hand attached which is turned by the upward movement of the upper longitudinal member substantially as shown and for the purpose set forth.

In testimony whereof I affix my signature in presence of two witnesses.

JAMES E. LONERGAN.

Witnesses:
JOHN O'NEILL,
THOMAS J. COYLE.